United States Patent
Rotole

(10) Patent No.: US 12,029,163 B2
(45) Date of Patent: Jul. 9, 2024

(54) WINDROWER HEADER SENSING AND CONTROL METHOD

(71) Applicant: DEERE & COMPANY, Moline, IL (US)

(72) Inventor: David V. Rotole, Bloomfield, IA (US)

(73) Assignee: DEERE & COMPANY, Moline, IL (US)

(*) Notice: Subject to any disclaimer, the term of this patent is extended or adjusted under 35 U.S.C. 154(b) by 898 days.

(21) Appl. No.: 16/444,539

(22) Filed: Jun. 18, 2019

(65) Prior Publication Data

US 2020/0128717 A1   Apr. 30, 2020

Related U.S. Application Data

(60) Provisional application No. 62/753,251, filed on Oct. 31, 2018.

(51) Int. Cl.
| | |
|---|---|
| A01D 41/14 | (2006.01) |
| A01B 63/00 | (2006.01) |
| A01B 63/10 | (2006.01) |
| A01B 63/108 | (2006.01) |

(52) U.S. Cl.
CPC .......... *A01D 41/141* (2013.01); *A01B 63/002* (2013.01); *A01B 63/1006* (2013.01); *A01B 63/108* (2013.01); *A01D 41/145* (2013.01)

(58) Field of Classification Search
CPC . A01B 63/002; A01B 63/1006; A01B 63/108; A01D 41/141; A01D 41/145
See application file for complete search history.

(56) References Cited

U.S. PATENT DOCUMENTS

| | | | | |
|---|---|---|---|---|
| 1,806,054 | A | * | 5/1931 | Gardner ................ E02F 3/7604 37/405 |
| 2,197,549 | A | * | 4/1940 | Hargrave et al. ......... E01H 5/12 172/554 |
| 3,841,410 | A | * | 10/1974 | Nikitin et al. .......... E02F 3/783 37/189 |
| 4,918,608 | A | * | 4/1990 | Middleton et al. ......................... G01S 7/52006 702/159 |

(Continued)

FOREIGN PATENT DOCUMENTS

| | | |
|---|---|---|
| RU | 2282971 C2 | 9/2006 |
| SU | 1482574 A1 | 5/1989 |

OTHER PUBLICATIONS

European Search Report issued in counterpart application No. 19204882.5 dated Jul. 23, 2020 (15 pages).

(Continued)

*Primary Examiner* — Thomas B Will
*Assistant Examiner* — Joel F. Mitchell
(74) *Attorney, Agent, or Firm* — Taft Stettinius & Hollister LLP; Stephen F. Rost

(57) ABSTRACT

A work machine that has an implement coupled to the frame of the work machine, a first sensor coupled to the implement, a controller, and an implement position system that couples the implement to the frame. The first sensor identifies the orientation of the implement along more than one axis and the controller manipulates the implement position system to reposition the implement relative to the frame based on the orientation of the implement identified by the first sensor.

17 Claims, 11 Drawing Sheets

(56) References Cited

U.S. PATENT DOCUMENTS

| | | | |
|---|---|---|---|
| 6,223,828 B1* | 5/2001 | Paulson et al. | A01B 43/00 171/110 |
| 8,046,939 B2* | 11/2011 | Hanson | E02F 9/26 37/232 |
| 8,473,166 B2* | 6/2013 | Zhdanov et al. | E02F 3/845 701/50 |
| 8,571,762 B2* | 10/2013 | McAree et al. | E02F 3/46 701/50 |
| 8,738,242 B2* | 5/2014 | Konno et al. | E02F 3/845 172/58 |
| 9,234,329 B2* | 1/2016 | Jaliwala et al. | G01S 19/14 |
| 10,066,367 B1 | 9/2018 | Wang et al. | |
| 2012/0239258 A1 | 9/2012 | Konno et al. | |
| 2013/0158819 A1* | 6/2013 | Callaway | E02F 3/845 701/50 |
| 2014/0150391 A1 | 6/2014 | Enns et al. | |
| 2014/0207331 A1 | 7/2014 | Kosarev et al. | |
| 2014/0324291 A1 | 10/2014 | Jones et al. | |
| 2016/0109270 A1 | 4/2016 | Zabegaev | |
| 2016/0270290 A1* | 9/2016 | Johnson et al. | A01D 75/287 |
| 2017/0064905 A1 | 3/2017 | Rotole et al. | |
| 2017/0114528 A1 | 4/2017 | Kosarev | |
| 2018/0092299 A1 | 4/2018 | Dombrowski et al. | |
| 2019/0082598 A1* | 3/2019 | Seiders, Jr. | A01D 41/141 |

OTHER PUBLICATIONS

Russian Search Report issued in counterpart application No. 2019130490 dated Apr. 27, 2020 (02 pages).

\* cited by examiner

WINDROWER HEADER SENSING AND CONTROL METHOD

CROSS-REFERENCE TO RELATED APPLICATIONS

The present disclosure claims the benefit of U.S. Provisional Application No. 62/753,251 filed on Oct. 31, 2018, the contents of which are hereby incorporated herein in entirety.

FIELD OF THE DISCLOSURE

The present disclosure relates to a header orientation system, and more particularly to a header orientation system that utilizes multi-axis sensor to identify the orientation of the header.

BACKGROUND OF THE DISCLOSURE

Many work machines have implements, headers, or the like that are capable of being repositioned relative to the work machine and, in turn, relative to the underlying surface. Work machines often have hydraulic systems that raise and lower the implement relative to the work machine and the underlying surface. Some work machines can further adjust the pitch, roll, yaw, and height of the implement with a hydraulic system. Adjusting the height, pitch, roll, and yaw of the implement allows the user to execute a work function, such as mowing, by orienting the implement in an ideal orientation for the conditions of the underlying surface.

Many work machines have visual indicators that identify the position of the implement relative to the work machine. These work machines have one or more linkage assembly that couple the implement to the work machine. Further, the visual indicator is often positioned on a portion of the linkage assembly that identifies the position of the implement relative to the work machine. In some cases, the user must exit the work machine or otherwise be positioned to observe the visual indicator to determine the orientation of the implement. The visual indicators can be difficult to use and require the user to stop the work machine and exit a cab to determine whether the implement is positioned in the proper orientation.

Other work machines have a sensor on a tilt cylinder of the implement. The sensor identifies the axial displacement of the tilt cylinder to further communicate to the user the tilt orientation of the implement. The tilt cylinder sensor is often coupled to an external part of the tilt cylinder and thus prone to being contacted or otherwise damaged during a work operation. Further, the tilt cylinder sensor typically only identifies the displacement of the tilt cylinder and not the attitude of the implement along multiple axes.

SUMMARY

One embodiment of the present disclosure is a work machine that has an implement coupled to the work machine and a first sensor coupled to the implement. Wherein, the first sensor identifies the orientation of the implement along more than one axis.

In one example of this embodiment, the first sensor identifies the orientation of the implement relative to a calibrated position.

In another example of this embodiment, the first sensor identifies the position of the implement along both a pitch axis and a roll axis and is configured to identify the height of the implement above an underlying surface.

Another example of this embodiment has a controller and an implement position system that couples the implement to the work machine, wherein the controller manipulates the implement position system to reposition the implement relative to the work machine.

Yet another example has a calibration process wherein the first sensor establishes a desired position relative to an underlying surface.

Another example has a second sensor coupled to the work machine, wherein the orientation of the implement is identified by comparing the values of the first sensor with the values of the second sensor. One aspect of this example has a calibration process wherein the second sensor establishes a level position relative to an underlying surface.

Another example of this embodiment has a calibration process wherein the first sensor establishes a lowered position and a raised position and can identify a plurality of positions there between.

Another embodiment of this disclosure is a method for identifying the orientation of an implement that includes providing a first sensor coupled to the implement, a controller, and a work machine, communicating, to the controller with the first sensor, an implement pitch position, an implement roll position, and an implement height position.

One example of this embodiment includes providing an implement position system that receives signals from the controller to reposition the implement, and storing a first position in the controller that corresponds with a first pitch position and a first roll position. Wherein the controller communicates with the first sensor to identify the implement pitch position and the implement roll position to selectively reposition the implement with the implement position system into the first position. One aspect of this example includes providing a second sensor in communication with the controller and coupled to the work machine, wherein the second sensor communicates to the controller a work machine pitch position and a work machine roll position relative to an underlying surface. In another aspect of this example, the controller determines the position of the implement relative to the underlying surface by identifying the pitch position and the roll position of the work machine relative to the underlying surface and by identifying the pitch position and the roll position of the implement relative to the work machine.

In another example of this embodiment, the first sensor communicates a yaw position of the implement to the controller.

In yet another example of this embodiment, the first sensor communicates an acceleration of the implement to the controller. One aspect of this example includes storing an acceleration threshold in the controller, wherein when the acceleration of the implement exceeds the acceleration threshold the controller sends a command to disengage the implement.

Another embodiment is An implement orientation system for a work machine that includes a work machine, an implement coupled to the work machine, a controller, a first sensor coupled to the work machine and communicating a work machine position to the controller, and a second sensor coupled to the implement and communicating an implement position to the controller. Wherein, the controller compares the implement position to the work machine position to identify the orientation of the implement with the underlying surface.

In one example of this embodiment, the first sensor communicates a work machine pitch to the controller and the second sensor communicates an implement pitch to the controller. In one aspect of this example, the controller compares the work machine pitch to the implement pitch to determine the position of the implement relative to the work machine.

Another example of this embodiment includes an implement position system communicating with the controller to alter the orientation of the implement relative to the work machine to a desired position, wherein the controller stores a work position, a raised position, and the desired position and the desired position is an operator input. In one aspect of this example, the controller transitions the implement between the work position and the raised position with the implement position system by comparing the work machine position to the implement position.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
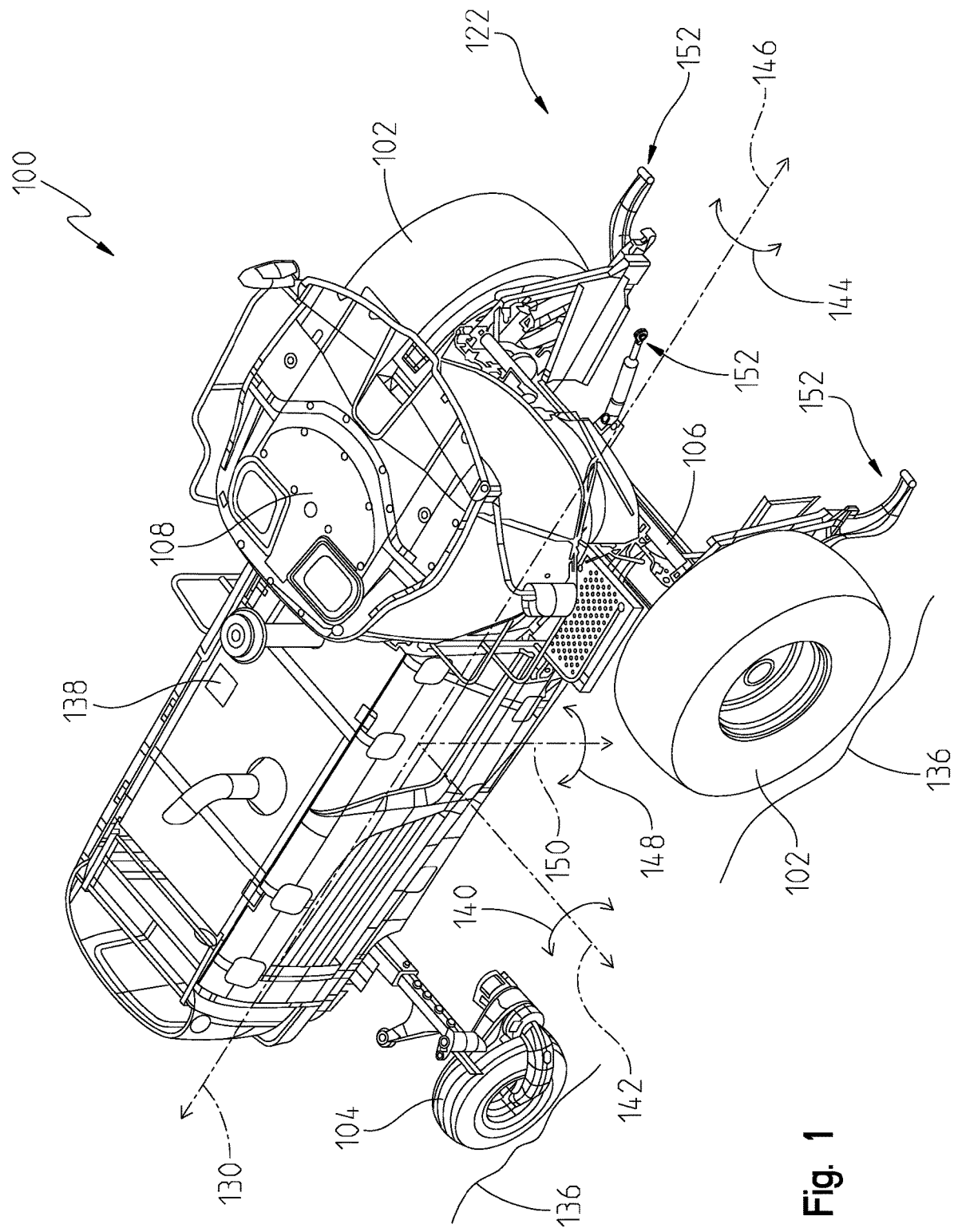
FIG. 1 is an elevated perspective view of a work machine with no implement coupled thereto.

With reference to FIG. 1, an elevated perspective view of a work machine 100 with no head or implement coupled thereto is illustrated. The work machine 100 may have at least one power unit that provides mechanical, electrical, and hydraulic power to the work machine 100. In one embodiment, the power unit provides power to rotate a pair of drive wheels 102 coupled to a frame 106 of the work machine 100. The drive wheels 102 may rotate relative to the work machine 100 to allow the work machine 100 to traverse an underlying surface 136. The work machine 100 may also define an axis of travel 130 disposed lengthwise through a central portion of the work machine 100.

In addition to drive wheels 102, the embodiment shown in FIG. 1 has a pair of swivel caster wheels 104. The caster wheels 104 may pivot freely about a mount to allow the work machine 100 to rotate as directed by the powered drive wheels 102. However, the particular configuration of the drive wheels 102 and caster wheels 104 should not be limiting. In a different embodiment, there may be no wheels at all. Rather, the power unit may provide power to a pair of tracks to allow the work machine to traverse the underlying surface. In yet another embodiment, the caster wheels 104 may not be swivel caster wheels but rather be wheels coupled to an axle and configured to be mechanically coupled to the power unit.

Regardless of how the work machine moves, the work machine 100 may also have a cabin 108 coupled to the frame 106. The cabin 108 may house a plurality of controls that allow a user to control the various systems of the work machine 100. In one non-exclusive embodiment, the plurality of controls allow the user to control mechanical, electrical, and hydraulic systems of the work machine 100. Further, one non-exclusive example of the controls may be a user interface 606 (See FIG. 6). The user interface 606 may be positioned in the cabin 108 and be a touch screen, one or more knobs or buttons, a lever, or any other known device capable of identifying a user input.

Figure 2:
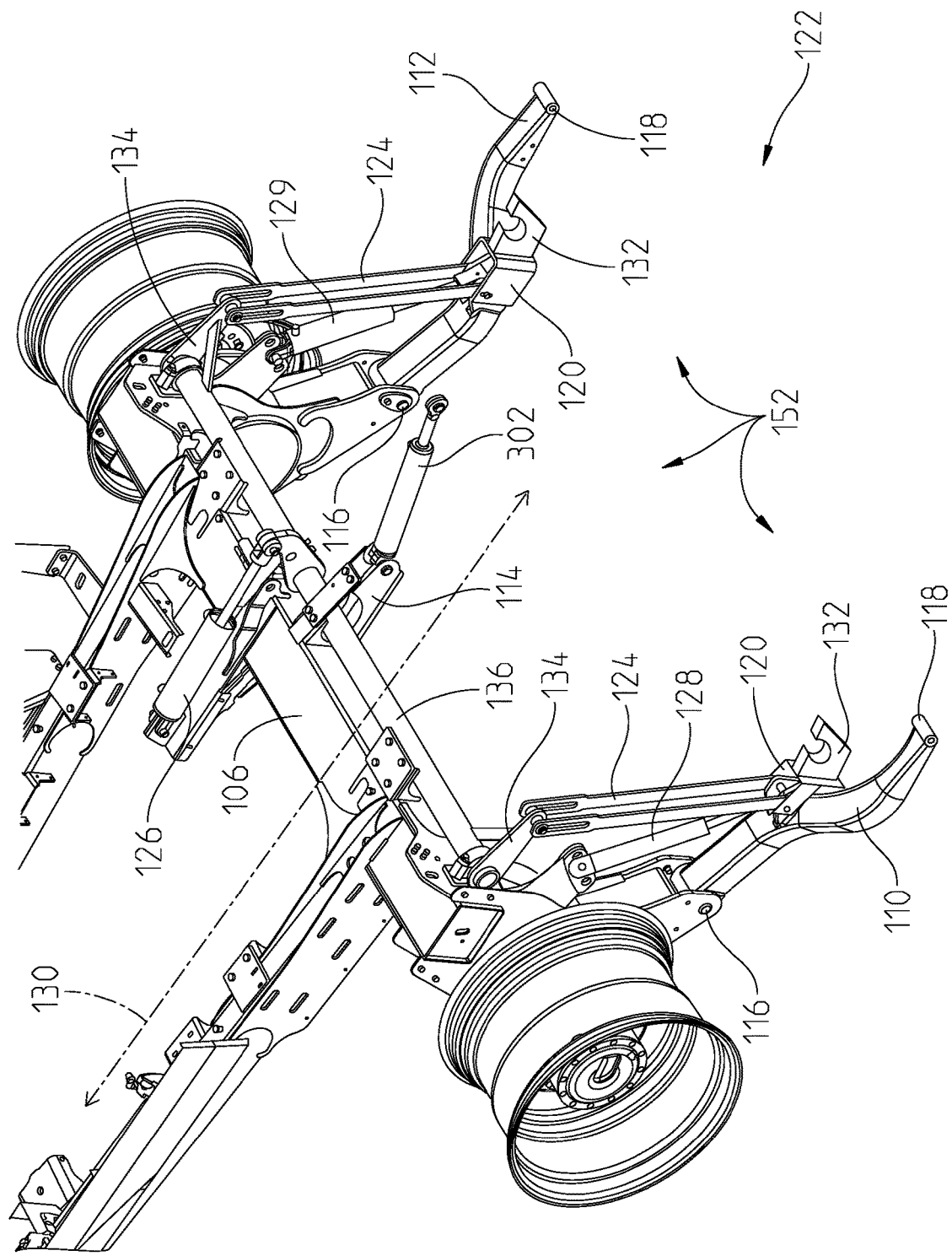
FIG. 2 is a partial elevated perspective view of the work machine of FIG. 1, with several components removed.

FIG. 2 more clearly illustrates mounting locations for a head or implement (head or implement not shown in FIG. 1 or FIG. 2). More particularly, a first lift arm 110, a second lift arm 112, an upper bracket 114, and an upper actuator 302 are shown in FIG. 2. The first and second lift arm 110, 112, along with the upper bracket 114, may be coupled to the implement to control both a height 318 (see FIG. 3) of the head relative to the underlying surface 136 as well as the angle of the head relative to the work machine 100.

In one embodiment, each lift arm 110, 112 may be pivotally coupled to the work machine 100 at a first pivot 116. The first pivot 116 may be located at a proximal portion of each lift arm 110, 112 relative to the frame 106. Further, each lift arm 110, 112 may extend away from the first pivot 116 towards a front end 122 of the work machine 100. Each lift arm 110, 112 may have a first coupler 118 defined at a distal end of the respective lift arm 110, 112. Each lift arm 110, 112 may also have a second coupler 120 coupled to the respective lift arm 110, 112 at a location between the first pivot 116 and the first coupler 118. In one embodiment, the second coupler 120 may have a latching mechanism 132 coupled thereto that can be disposed in either a latch position or a release position.

A first and second float cylinder 128, 129 may be coupled between the frame 106 and the first and second lift arms 110, 112 respectively. More specifically, at least one link arm 124 may be pivotally coupled to each lift arm 110, 112 on one end and to a cam pivot arm 134 on the other. The cam pivot arm 134 may be coupled to a lift arm axle 136 that may be rotated by a lift cylinder 126. When the lift cylinder 126 rotates the lift arm axle 136, the pivot arm 134 may rotate therewith and adjust the position of the respective lift arm 110, 112, with the respective link arm 124. In one aspect of this disclosure, the orientation of the lift cylinder 126 may control, in part, the height 318 of the implement relative to the underlying surface 136.

While one example of a lift cylinder 126 is illustrated, this disclosure considers any known method of manipulating the position of an implement relative to a work machine. More specifically, in other embodiments the float cylinders 128, 129 may be actuators that are selectively repositioned by a controller 608 (see FIG. 6) independent of one another. In this configuration, the float cylinders 128, 129 can raise each of the lift arms 110, 112 at the same time or selectively raise each of the lift arms 110, 112 independently of one another. Accordingly, the orientation of the implement may be varied through at least the float cylinders 128, 129 and the lift cylinder 126.

In one embodiment, the lift cylinder 126 pivots the lift arms 110, 112 between a raised position and a lowered position. The lift cylinder 126 may also allow for adjusting the height 318 of the head when the head is in the lowered position. In this embodiment, the lift cylinder 126 may control the height 318 of the head relative to the underlying surface 136 while the float cylinders 128, 129 may be coupled to each lift arm 110, 112 to provide dampened resistance when the head encounters a movement force. More specifically, the float cylinders 128, 129 may provide a biasing force on the lift arms 110, 112 away from the underlying surface 136. When the lift arms 110, 112 are coupled to the head, the lift cylinder 126 may position the head the desired height away from the underlying surface. The float cylinders 128, 129 may provide the biasing force on the lift arms 110, 112 so the head may more easily rise relative to the underlying surface 136 if it contacts an obstacle thereon. Further, the float cylinders 128, 129 may allow the user to adjust the biasing force of the head relative to the underlying surface by increasing or decreasing a float cylinder force of the respective lift arms 110, 112.

In one embodiment, the link arm 124 may be pivotally coupled to the cam pivot arm 134 by a pin disposed in a slot of the link arm 124. The slotted engagement allows the lift cylinder 126 to transition the lift arms 110, 112 to a lowered position (where the pin is at an uppermost portion of the slot) and allow the float cylinders 128, 129 to provide the biasing force to the head to allow the head to move away from the underlying surface should it contact an obstacle thereon. More specifically, when the pin is in the upper portion of the slot, and the head contacts an obstacle along the underlying surface, the float cylinders 128, 129 can provide the biasing force to assist raising the head over the underlying obstacle. Further, as the head is raised over the underlying obstacle, the pin may transition towards a lower portion of the slot. Once the obstacle has been fully traversed, the pin may return to the top portion of the slot and the height 318 of the head may be maintained by the cylinder 126.

Figure 3:
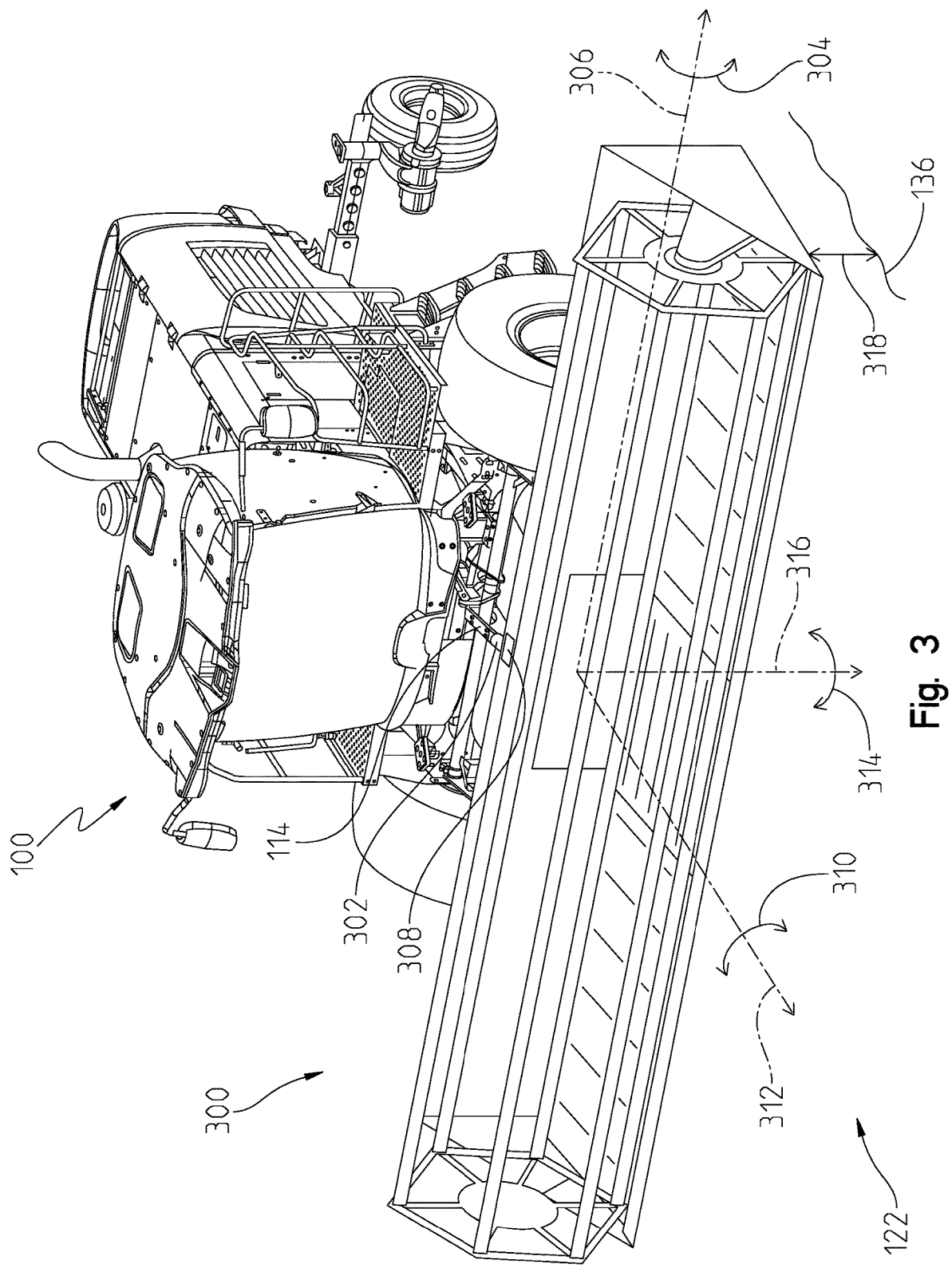
FIG. 3 is an elevated perspective view of the work machine of FIG. 1 with a draper head coupled thereto.

Referring now to FIG. 3, the work machine 100 is illustrated with an implement 300 such as a draper head coupled thereto. The implement 300 may be coupled to the work machine 100 by the second coupler 120 of the respective first and second lift arm 110, 112. Further, the implement 300 may also be coupled to the upper bracket 114 through the upper link 302. In one embodiment, the upper link 302 may be a hydraulic cylinder that may be selectively actuated by the user through the plurality of controls. The upper link 302 may be pivotally coupled to the upper bracket 114 on a base end and pivotally coupled to a head mount of the implement 300 on a head end.

In one embodiment, the controller 608 may selectively actuate the upper link 302 to alter the orientation of the implement 300. In this embodiment, if the upper link 302 is actuated to become longer, the implement 300 may change a pitch 304 as it rotates away from the work machine 100 about a pitch axis 306. More specifically, as the upper link 302 extends, a portion of the implement 300 towards the front end 122 is moved towards the underlying surface. Alternatively, if the upper link 302 is actuated to become shorter, the implement 300 may rotate in an upward direction towards the work machine 100. Further, as the upper link 302 contracts, a front end 122 portion of the implement 300 is pivoted away from the underlying surface 136.

Figure 4:
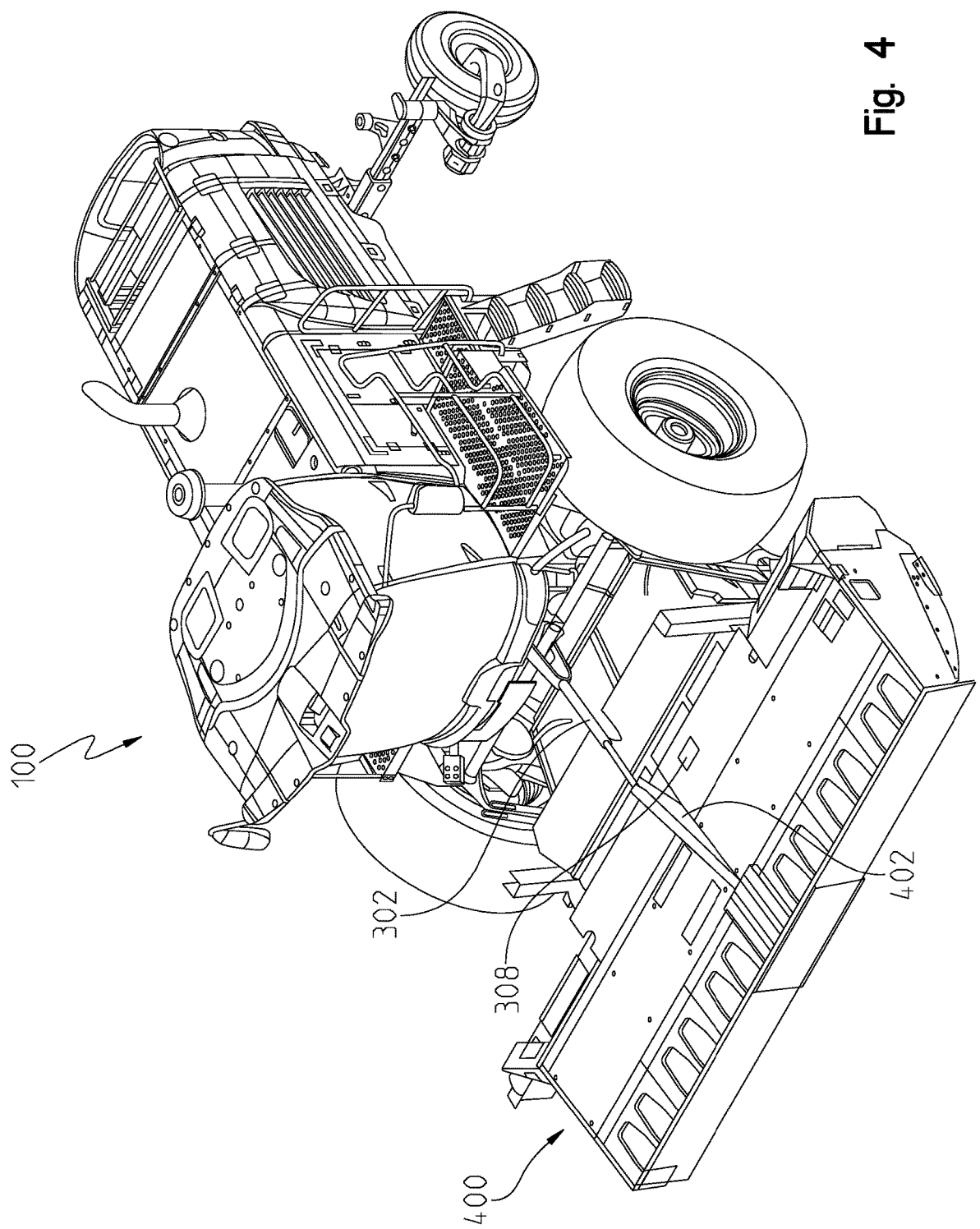
FIG. 4 is an elevated perspective view of a work machine of FIG. 1 with a rotary head coupled thereto.

Referring now to FIG. 4, the work machine 100 is illustrated with a rotary head 400 implement coupled thereto. The rotary head 400 may be coupled to the work machine 100 through the lift arms 110, 112 and the upper link 302 similarly to the implement 300. Further, the term implement used herein may be referring to any type of implement or header known in the art and the examples presented are not meant to be exhaustive.

FIG. 4 more clearly shows how the rotary head 400 is coupled to the work machine 100. More specifically, the upper link 302 may pivotally couple the upper bracket 114 to a rotary bracket 402. The upper link 302 may control the angular orientation of the rotary head 400 relative to the underlying surface in a similar manner as described in more detail above for the implement 300. Accordingly, the features described above for the upper link 302 are equally applicable here and are considered incorporated herein for the rotary head 400 as well.

Figure 5:
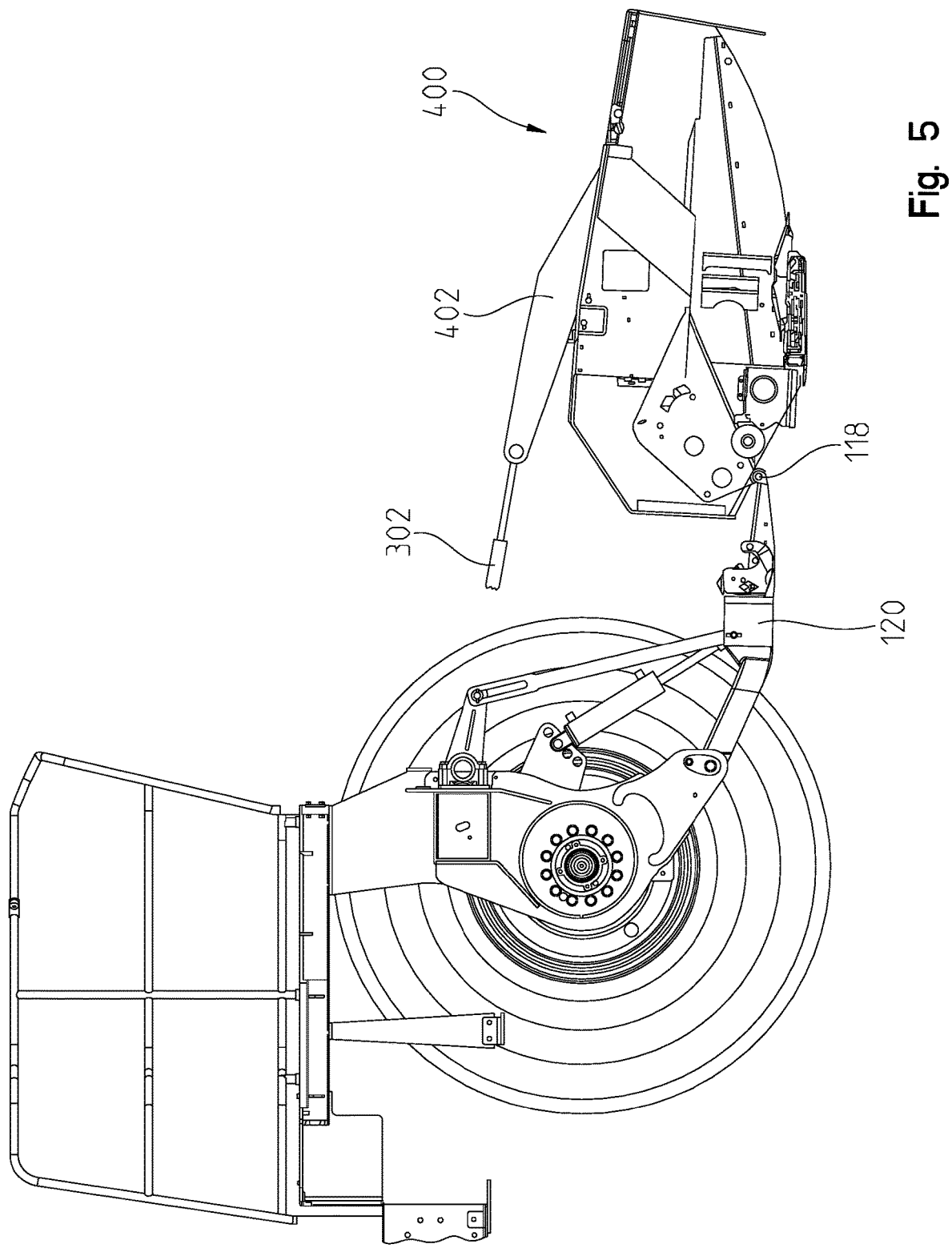
FIG. 5 is a partial side view of the work machine of FIG. 4.

Referring now to FIG. 5, the first coupler 118 is shown pivotally coupled to the rotary head 400. In one embodiment, the first coupler 118 can couple to the rotary head 400 without contacting the second coupler 120.

In one aspect of this disclosure, a single implement sensor 308 may be coupled to the implement 300 to identify the orientation of, and forces experienced by, the implement 300, 400. The implement sensor 308 may be an inertial measuring unit that has a three axis microelectromechanical system accelerometer and a three axis microelectromechanical gyroscope. The implement sensor 308 may be configured to identify the orientation of the implement 300 such as the pitch 304 about the pitch axis 306, a roll 310 about a roll axis 312, and a yaw 314 about a yaw axis 316. Further, the first sensor 308 may identify acceleration values experienced by the implement 300. The single implement sensor 308 may be positioned at a location on the implement that is substantially protected from exposure to harmful debris.

In one aspect of this disclosure, the pitch 304, yaw 314, and roll 310 of the implement 300 may all be controlled by an implement position system 152. The implement position system 152 may be controlled by one or more controller 608 to manipulate one or more of the float cylinders 128, 129, the upper link 302, and the lift cylinder 126 to reposition an implement coupled thereto. More specifically, one embodiment considered herein allows the roll of the implement 300 to be modified by raising the first lift arm 110 with the first float cylinder 128 while maintaining the position of the second lift arm 112 with the second float cylinder 129 or vice versa. Similarly, the pitch of the implement 100 may be manipulated by the implement position system 152 by modifying the length of the upper link 302 with the controller 608. In yet another example, the first and second lift arms 110, 112 may be a first lift arm length cylinder 602 and a second lift arm length cylinder 604 that are actuators in communication with the controller 608 and configured to change orientation to modify the yaw 314 of the implement 100 among other things.

While a particular type of implement position system 152 is shown and described herein, this disclosure considers any type of implement position system known in the art. More specifically, a common three-point hitch assembly may implement the teachings of this disclosure. For example, the three-point hitch assembly may have three actuators in communication with a controller to reposition the height 318 of the implement relative to the underlying surface 136. Further, the three-point hitch may utilize three actuators to reorient an implement coupled thereto in any one or more of the yaw 314, pitch 304, or roll 310 directions.

Similarly, a single work machine sensor 138 may be coupled to the work machine 100 to identify the orientation and forces experienced by the work machine 100. The work machine sensor 138 may also be an inertial measuring unit that has a three axis microelectromechanical system accelerometer and a three axis microelectromechanical gyroscope. The work machine sensor 138 may be configured to identify a pitch 140 about a pitch axis 142, a roll 144 about a roll axis 146, and a yaw 148 about a yaw axis 150. Further, the work machine sensor 138 may identify acceleration values experienced by the work machine 100. In one non-exclusive example, the work machine sensor 130 is coupled to the frame 106 of the work machine 100.

Figure 6:
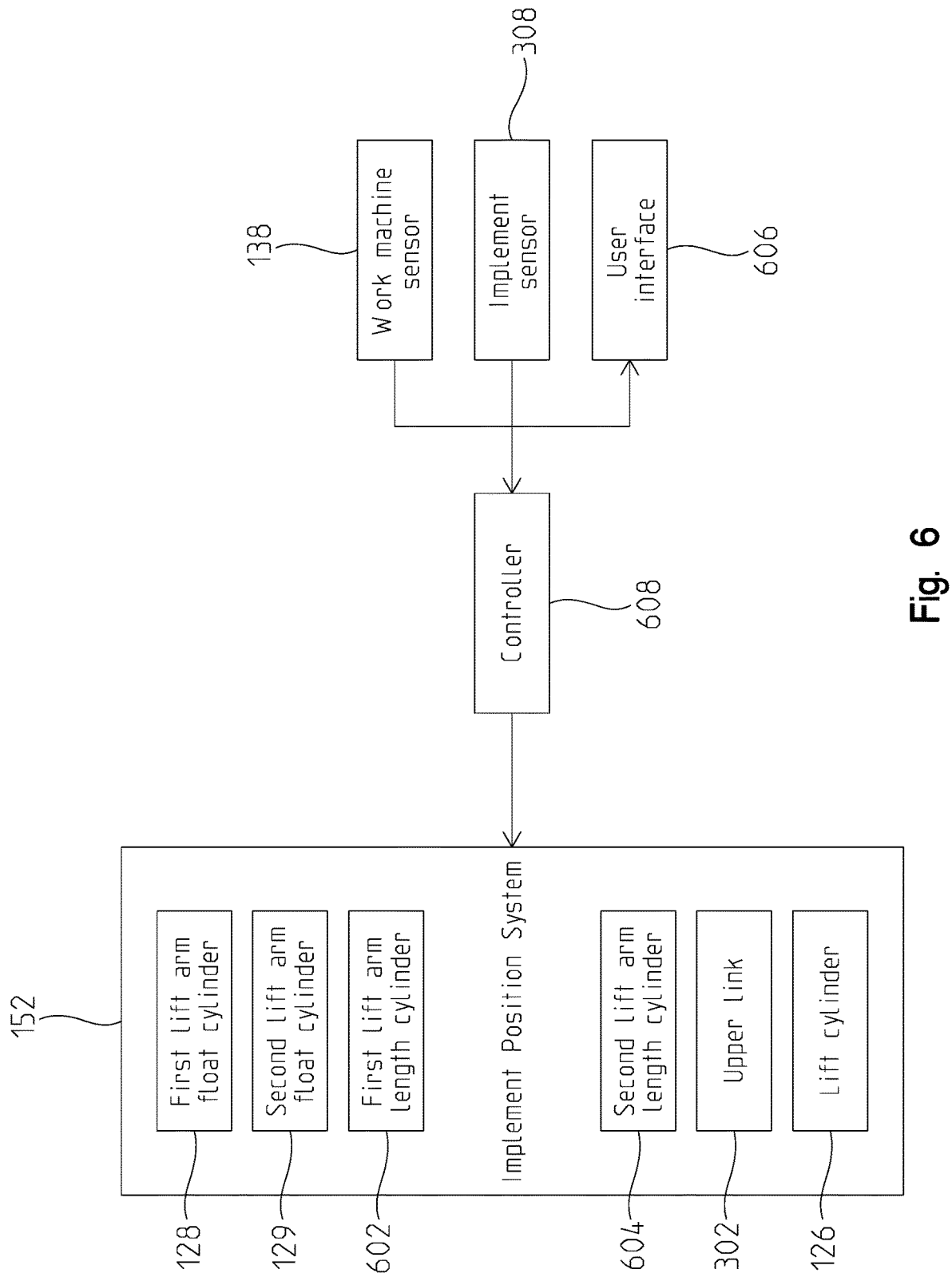
FIG. 6 is an exemplary schematic view of components of a control system.

Referring now to FIG. 6, a schematic view of several components described herein is illustrated. More specifically, the orientation of the components of the implement position system 152 may be selectively altered by one or more controller 608. The controller 608 may be a single controller that has a processor and a memory unit stored thereon or the controller may access a memory unit or processor located remotely therefrom. Further still, in another embodiment considered herein multiple controllers implement the teachings of this disclosure. Further still, in one embodiment a remote user interface 606 may act as the controller 608 to execute the functions described herein.

Regardless of the type or location of the controller 608, the controller 608 may selectively alter the orientation of the implement 300 with the implement position system 152. More specifically, an electro-hydraulic system, electro-pneumatic system, or an electrical system may selectively reposition corresponding actuators. For example, the electro-hydraulic and electro-pneumatic systems may have a plurality of hydraulic or pneumatic valves that are repositionable by the controller 608 via an electrical system to provide varying fluid flows and pressures to the actuators. Similarly, electrical systems may have electrical actuators that are repositioned by the controller 608 to alter the orientation of the implement 300. Accordingly, this disclosure considers using any known method for manipulating the implement 300 with the implement position system 152.

Whether the implement position system 152 uses hydraulic, pneumatic, or electrical power to reposition the implement 300, the implement 300 may be movable in each of the pitch 304, roll 310, and yaw 314 directions via the implement position system 152. In one non-exclusive example, the controller 608 may move the implement in the roll position by altering the length of only one of the float cylinders 128, 129. Similarly, the controller 608 can move the implement in the pitch direction 304 by altering the length of the upper link 302. Further still, the controller 608 can move the implement in the yaw direction 312 by altering the length of the first lift arm 110 with the first lift arm length cylinder 602 or by altering the length of the second lift arm 112 with the second lift arm length cylinder 604.

While one particular implement position system 152 is shown and described herein, this disclosure considers using other embodiments as well. More specifically, in one embodiment the implement position system may be a three linkage coupler that couples the implement to the work machine. Each of the three linkages may be an actuator that has a variable length controlled by the controller 608. In this configuration, the controller 608 can alter the lengths of the three linkages to manipulate the implement in the pitch, roll, and yaw directions 304, 312, 314. Accordingly, any known implement positioning system is considered herein as being movable by the controller 608 as described herein.

Figure 7:
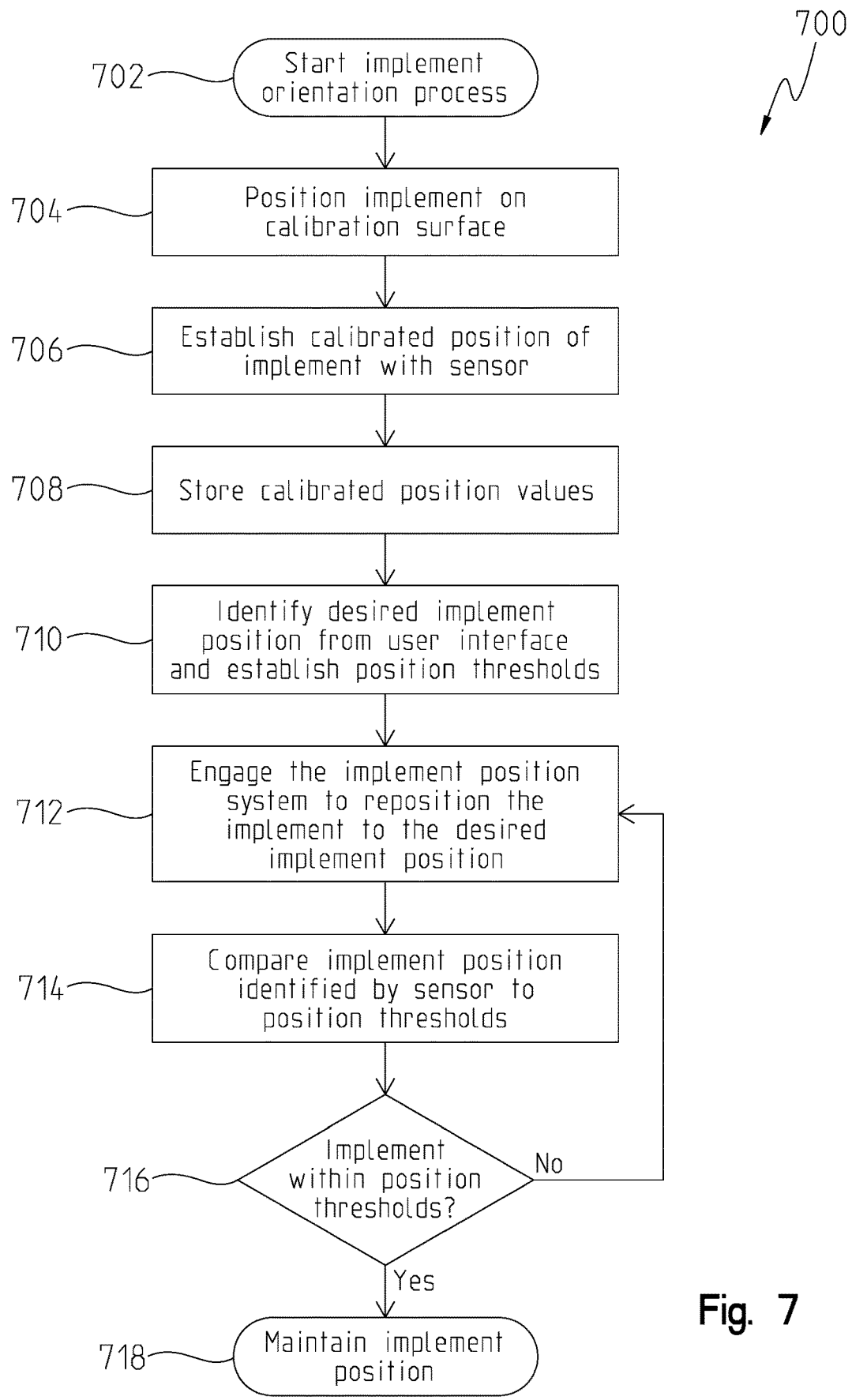
FIG. 7 is a schematic view of one embodiment of an implement position logic system.

Referring now to FIG. 7, one non-exclusive example of an implement position logic 700 is illustrated. The implement position logic 700 may utilize the implement sensor 308, the implement position system 152, and the controller 608 to selectively control the position of the implement 300, 400. More specifically, the implement position logic 700 may be selectively initiated in box 702. The implement initiation box 702 may be selectively initiated by a user via the user interface 606 or automatically initiated by the controller 608 based on the conditions of the work machine. For example, the user interface 606 may have an option for the user to start the implement orientation process such as a push button, an icon on a touch screen, a voice command, or any other known user interface selection method. Alternatively, the controller 608 may initiate box 702 when the work machine 100 is turned to a run position or the like.

Regardless of the method used to start the implement orientation process of box 702, in box 704 the user may be instructed or otherwise prompted to position the implement on a calibration surface. In one non-exclusive example, the user interface 606 may be used to instruct the user to position the implement on a calibration surface. Alternatively, in one embodiment box 704 may be an assumed condition when the start implement orientation process 702 is initiated. Accordingly, in at least one embodiment box 704 may be part of box 702.

In box 706 the controller 608 may establish at least one calibrated or reference position of the implement. In one non-exclusive example, the calibrated position may be the position in which the implement is resting on the underlying surface. In another example, the reference position may be determined relative to an external source such as a base station sensor or the like. Further, in one aspect of this disclosure the user interface 606 may continue to instruct the user to position the implement on a level surface during box 706. In one example of this disclosure, box 706 may include storing multiple calibrated positions. More specifically, in addition to storing the position data from the implement sensor 308 when the implement is resting on the underlying surface, the controller 608 may also move the implement to a fully raised position and store position data from the implement sensor 308 in the fully raised position as well. Further still, the controller 608 may move the implement to any orientation and store the position data therein as part of box 706.

A level, flat surface may be recommended during box 706, but this disclosure may implement the teachings described herein regardless of the orientation of the underlying surface as long as the work machine and implement are oriented in substantially the same way relative to the underlying surface. That is to say, as long is the underlying surface is relatively planar, the box 706 may be effectively executed even if the surface is not level.

The controller 608 may establish the calibrated position or positions in box 706 by allowing the implement position system 152 to be positioned in a neutral state wherein any actuators or the like are not powered. In the neutral state, the implement 300, 400 may fall to the underlying surface responsive to the gravitational force acting on the implement. More specifically, if the implement position system is hydraulic or pneumatic, any cylinders utilized therein may not be pressurized and allowed to reposition as the implement falls to the underlying surface. Similarly, if the implement position system 152 utilizes electrical actuators they may not be powered in box 706 to allow the implement to become positioned along the underlying surface. Alternatively, the actuators of the implement position system 152 may be powered to direct the implement to a ground position in box 704, 706.

In box 708, the controller 608 may utilize the implement sensor 308 to identify and store calibrated position values of the implement. More specifically, if the implement sensor 308 is an inertial measuring unit described above, the controller 608 may identify a pitch position about the pitch axis 306, a roll position about the roll axis 312, and a yaw position about a yaw axis 316 in box 708. The controller 608 may gather and store the corresponding position utilizing the three axis microelectromechanical system accelerometer and the three axis microelectromechanical gyroscope of the implement sensor 308. The stored positions may be utilized by the controller 608 to identify the orientation of the implement 300, 400 when it is contacting the underlying surface.

Further, the controller 608 may store a plurality of position data points for each orientation of the implement. For example, the controller 608 may store data points for each of the pitch, roll, yaw, and height when the implement is on the underlying surface and also store data points for the pitch, roll, yaw, and height when the implement is in a fully raised position. Further still, the controller 608 may store data points for any other orientation of the implement 300, 400.

Next, in box 710, the controller 608 may identify the desired implement position from the user interface 606. More specifically, the user interface 606 may have selections for the height of the implement above the underlying surface, yaw of the implement, pitch of the implement, and roll of the implement among other things. Alternatively, the user interface 606 may have preset implement orientations stored therein where the height, yaw, pitch, and roll are all established based on a preset selection. In one non-exclusive example, the desired implement position may be any position between the position identified when the implement is on the ground and the fully raised position identified in box 706.

In one non-exclusive example of this disclosure, the controller 608 may establish threshold values based on the desired implement position in box 710. For example, the controller 608 may have preset tolerances above and below the desired implement position selected by the user. More specifically, if the user identifies a desired height of five inches, the controller may set a lower threshold height of about four inches and an upper threshold of about six inches as one non-exclusive example. Similarly, the desired implement position may correspond with a pitch angle, a roll angle, and a yaw angle. The controller 608 may also establish upper and lower thresholds that correspond with the pitch, roll, and yaw angles identified. For example, the upper angle threshold may be one degree greater than the desired angle and the lower angle threshold may be one degree less than the desired angle.

While some specific threshold values are described herein, this disclosure considers utilizing threshold values that are greater than, and less than, those described. Further still, in one embodiment the user may select the threshold values with the user interface 606 instead of automatically deriving the threshold values from the desired implement position. Accordingly, this disclosure considers utilizing many different threshold values in box 710.

In box 712, the controller 608 may engage the implement position system 152 to reposition the implement to the desired implement position identified in box 710. In this box, the controller 608 may utilize any one or more of the first lift arm float cylinder 128, the second lift arm float cylinder 129, the first lift arm length cylinder 602, the second lift arm length cylinder 604, the upper link 302, or the lift cylinder 126 to reposition the implement to become oriented within the threshold values of the desired implement position. More specifically, in box 714 the controller 608 may continually monitor the implement sensor 308 as it manipulates the implement position system 152 towards the desired implement position established in box 710.

In box 716, the controller 608 determines whether the implement position is within the implement position threshold established in box 710. More specifically, the controller 608 identifies the height, yaw angle, roll angle, and pitch angle with the implement sensor 308 by comparing the current sensor 308 readings to the calibrated position values of box 708. In other words, in box 716 the controller 608 compares the identified values with the implement position threshold values. If the identified values are not within the threshold values compared to the calibrated position values, the controller 608 may repeats boxes 712, 714, and 716 until the identified values are within the threshold values. Once the identified values are within the threshold values in box 716, the controller 608 may maintain the implement position with the implement position system 152 in box 718.

Figure 8:
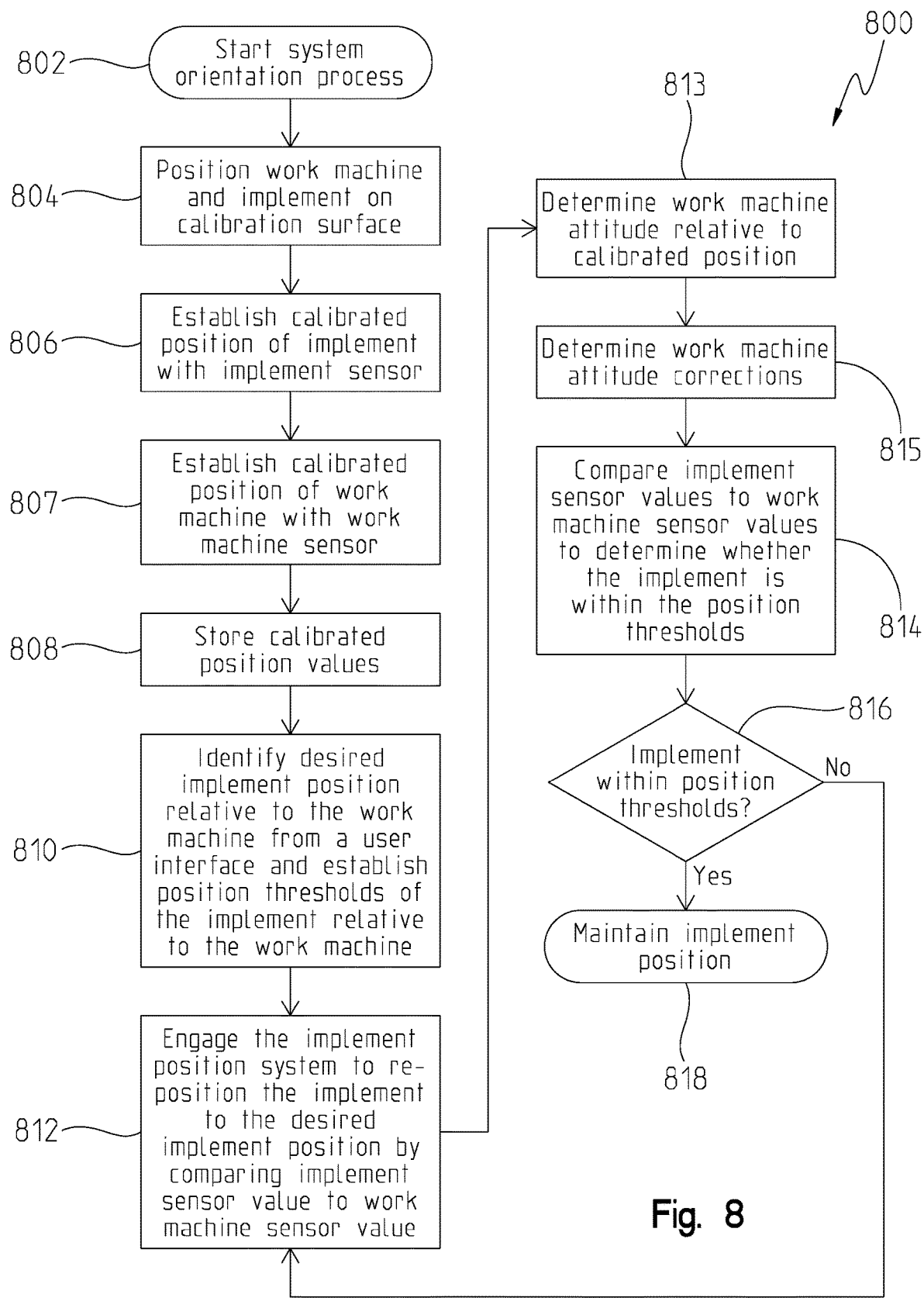
FIG. 8 is a schematic view of another embodiment of an implement position logic system.

Referring now to FIG. 8, one non-exclusive example of an implement and work machine position logic 800 is illustrated. The implement and work machine position logic 800 may utilize the implement sensor 308, the implement position system 152, the work machine sensor 138, and the controller 608 to selectively control the position of the implement 300. More specifically, the implement and work machine position logic 800 may be selectively initiated in box 802. The implement orientation box 802 may be selectively initiated by a user via the user interface 606 or automatically initiated by the controller 608 based on the conditions of the work machine as describe above for box 702.

Regardless of the method used to start the implement orientation process of box 802, in box 804 the user may be instructed or otherwise prompted to position the implement 300, 400 and the work machine on a calibration surface. In one non-exclusive example, the user interface 606 may be used to instruct the user to position the implement on a calibration surface. Alternatively, in one embodiment box 804 may be assumed when the start implement orientation process 802 is initiated. Accordingly, in at least one embodiment box 804 may be part of box 802. In one non-exclusive example, the calibration surface may be an underlying surface that is substantially level and flat.

In box 806 the controller 608 may establish one or more calibrated positions of the implement using the implement sensor 308 similar to box 706 described above. In one non-exclusive example, a first calibrated position may be the position in which the implement 300, 400 is resting on the underlying surface 136 and a second calibrated position may be the position in which the implement is in a fully raised position. Further, in one aspect of this disclosure the user interface 606 may continue to instruct the user to position the implement on a level surface during box 806. A level, flat surface may be recommended during box 806, but this disclosure may implement the teachings described herein regardless of the orientation of the underlying surface as long as the work machine and implement are oriented in substantially the same way relative to the underlying surface. That is to say, as long is the underlying surface is relatively planar, the box 806 may be effectively executed even if the surface is not level.

Similarly, in box 807 the controller 608 may utilize the work machine sensor 138 to establish a calibrated position of the work machine. In one non-exclusive example, the calibrated position may be the position in which the work machine 100 is sitting on a flat surface. While a level underlying surface may be preferred, boxes 806 and 807 can be performed on a plane offset from level as well. In one aspect of this disclosure, the controller 608 uses the work machine sensor 138 to establish the planar orientation of the underlying surface.

In box 808, the controller 608 may utilize the implement sensor 308 and the work machine sensor 138 to identify and store calibrated position values of the implement 300, 400 and the work machine 100. More specifically, if the implement sensor 308 is an inertial measuring unit described above, the controller 608 may identify a pitch position about the pitch axis 306, roll position about the roll axis 312, and yaw position about a yaw axis 316 in box 808. The work machine sensor 138 may similarly be an inertial measuring unit described above and coupled to the chassis of the work machine 100. In this configuration, the controller 608 may identify a pitch position about the pitch axis 142, a roll position about the roll axis 146, and a yaw position about a yaw axis 150 in box 808. The controller 608 may gather and store the corresponding position data utilizing the three axis microelectromechanical system accelerometer and the three axis microelectromechanical gyroscope of the implement sensor 308 and the work machine sensor 138. The stored positions may be utilized by the controller 608 to identify the orientation of the implement 300, 400 and the work machine 100 when the implement is contacting the underlying surface, in the fully raised position, and in any other calibration position.

Next, in box 810, the controller 608 may identify the desired implement position from the user interface 606 similar to box 710. More specifically, the user interface 606 may have selections for the height of the implement above the underlying surface, yaw of the implement, pitch of the implement, and roll of the implement among other things. Alternatively, the user interface may have preset implement orientations stored therein where the height, yaw, pitch, and roll are all established based on a preset selection. In one aspect of this embodiment, the desired implement position may be determined by establishing offset values of the implement sensor 308 relative to the work machine sensor 138.

In one non-exclusive example of this disclosure, the controller 608 may establish threshold values based on the desired implement position in box 810. For example, the controller 608 may have preset tolerances above and below the desired implement position selected by the user as described above for box 710.

Further, in one example of this embodiment the desired implement position may be an offset of the current work machine position. More specifically, the work machine sensor 138 may establish the current orientation of the underlying surface by communicating the roll 144, pitch 140, and yaw 146 of the work machine 100 to the controller 608. Then the controller 608 can utilize the implement sensor 308 to ensure that the implement 300 remains in the desired implement position relative to the underlying surface. For example, if the user desires the implement to have an offset pitch angle relative to the underlying surface, the controller 608 may first determine the pitch angle of the underlying surface utilizing the work machine sensor 138 and then manipulate the implement with the implement position system 152 so that the pitch angle of the implement 300, 400 relative to the underlying surface 136 is the offset pitch angle selected by the user. While pitch angle has been specifically described herein, this disclosure considers comparing the implement sensor 308 values to the work machine sensor 138 values for any of the pitch, yaw, roll, and height orientations.

In box 812, the controller 608 may engage the implement position system 152 to reposition the implement to the desired implement position identified in box 810. In this box, the controller 608 may utilize any one or more of the first lift arm float cylinder 128, the second lift arm float cylinder 129, the first lift arm length cylinder 602, the second lift arm length cylinder 604, the upper link 302, or the lift cylinder 126 to reposition the implement 300, 400 to become oriented within the threshold values of the desired implement position established in box 810. Further, in box 813 the controller 608 may determine the current work machine attitude or orientation relative to the calibrated orientation with the work machine sensor 138. Similarly, in box 815 the controller 608 may determine correction values of the current work machine attitude or orientation relative to the calibrated orientation of the work machine 100. In other words, in box 815 the controller 608 may determine how much the orientation of the work machine 100 has changed relative to the calibrated position and assign attitude correction values thereto. The attitude correction values may be the difference between the calibrated position values and the work machine attitude identified in box 813. Accordingly, in box 814 the controller 608 may continually monitor the work machine sensor 138 and the implement sensor 308 as it manipulates the implement position system 152 towards the desired implement position established in box 810.

In box 816, the controller 608 determines whether the implement position is within the implement position threshold established in box 810. More specifically, the controller 608 identifies the height, yaw angle, roll angle, and pitch angle with the work machine sensor 138 and the implement sensor 308 and compares the identified values with the implement position threshold values. If the identified values are not within the threshold values, the controller 608 may repeat boxes 812, 813, 815, 814, and 816 until the identified values are within the threshold values. Once the identified values are within the threshold values in box 816, the controller 608 may maintain the implement position with the implement position system 152 in box 818.

Figure 9:
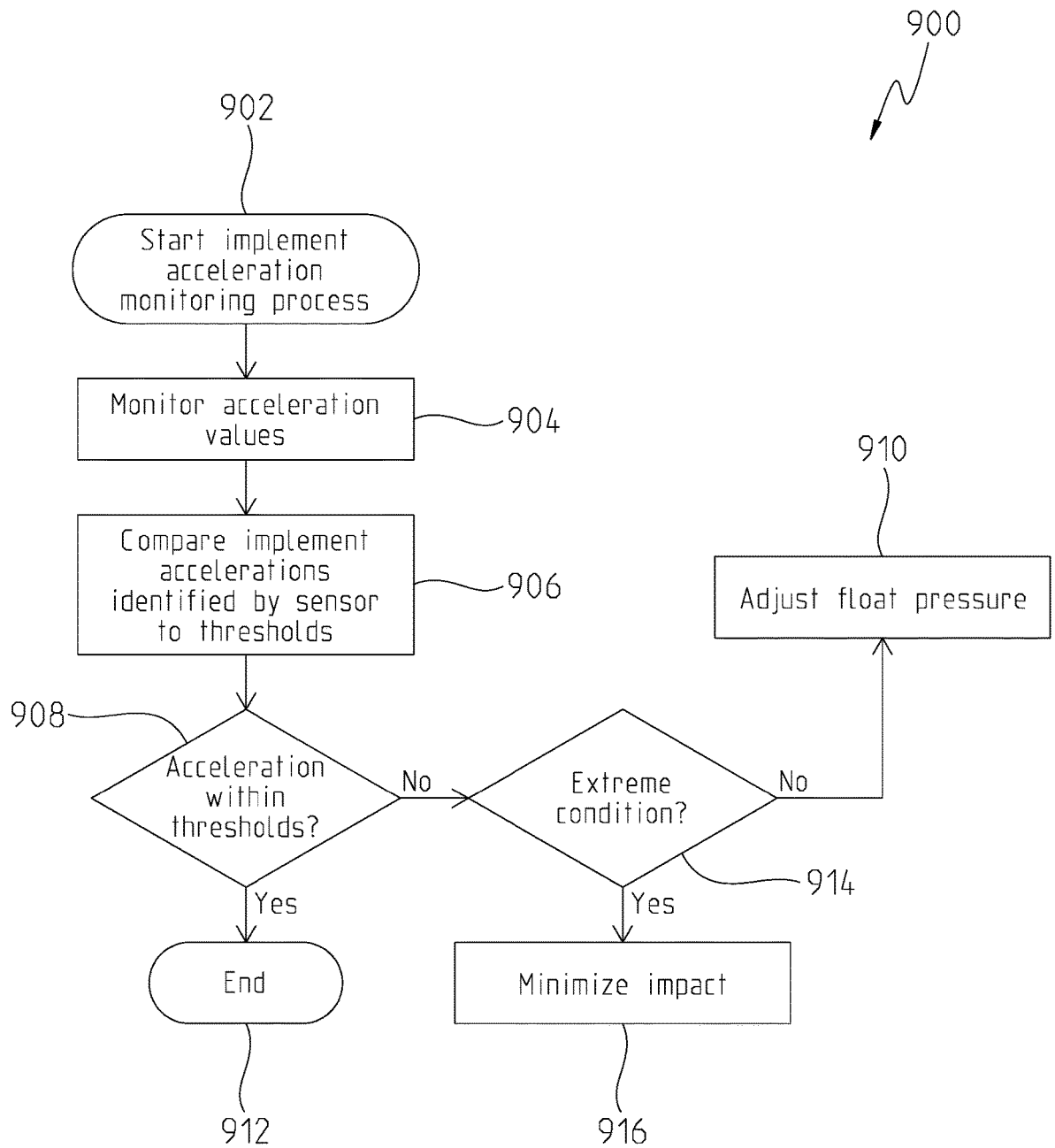
FIG. 9 is a schematic view of a float cylinder control logic system.

Referring now to FIG. 9 one embodiment of a float pressure logic 900 is disclosed. In one embodiment of the implement position system 152, the pressure provided to the float cylinders 128, 129 may be altered by the controller 608 to provide a variable springed force to the lift arms 110, 112 and thereby to any implement coupled thereto. The springe force provided by the float cylinders 128, 129 may help the implement 300, 400 pass over any obstacles it contacts on the underlying surface as described above. In one aspect of this disclosure, the float pressure logic 900 may utilize the implement sensor 308 to modify the float pressure and thereby the springed force applied by the float cylinders 128, 129.

Box 902 may initiate the implement acceleration monitoring process. Box 902 may be automatically initiated when the work machine is in an on state or it may be initiated by the user via the user interface 606. Regardless of how the float pressure logic is initiated, once it is initiated the controller 608 may monitor the implement sensor 308 to determine the acceleration values experienced by the implement 300, 400 in box 904. More specifically, the controller 608 may utilize the three axis microelectromechanical system accelerometer of the implement sensor 308 to determine the acceleration values experienced by the implement 300, 400.

In box 906, the controller 608 may compare the acceleration values identified in box 904 with acceleration threshold stored in the controller 608 or input therein through the user interface 606. In one example of this embodiment, the acceleration thresholds may be ideal acceleration values that the implement would apply in an ideal work environment. Alternatively, the user may input the ideal acceleration values they would like applied to the implement via the float cylinders 128, 129 by inputting the acceleration values through the user interface 606.

Whether the threshold value is pre-set in the controller 608 or input by a user through the user interface 606 in box 908 the controller 608 may compare active acceleration values measured by the implement sensor 308 to the acceleration thresholds identified in box 906. If the acceleration values are not within the threshold range, the controller 608 may adjust the float pressure in box 910. More specifically, the controller 608 may increase or decrease the float pressure applied to the float cylinders 128, 129 based on the acceleration values identified by the implement sensor 308. However, if the acceleration values are within the threshold values in box 908, the controller 608 may end this logic sequence or continue to compare the acceleration values to the threshold values in box 912.

In yet another aspect of this disclosure, the acceleration values identified by the implement sensor 308 may be monitored by the controller 608 to determine when the implement has an extreme contact in box 914. An extreme contact may occur when the implement hits a large rock, stump, or other obstruction on the underlying surface. In this example, when the implement sensor 308 identifies an extreme contact in box 914, the controller 608 may adjust the working conditions of the implement in box 916. In one non-exclusive example, this may include reducing power to the implement 300, 400, stopping the work machine 100, or executing any other function to minimize the risk of damaging the work machine 100 or implement 300, 400.

Figure 10:
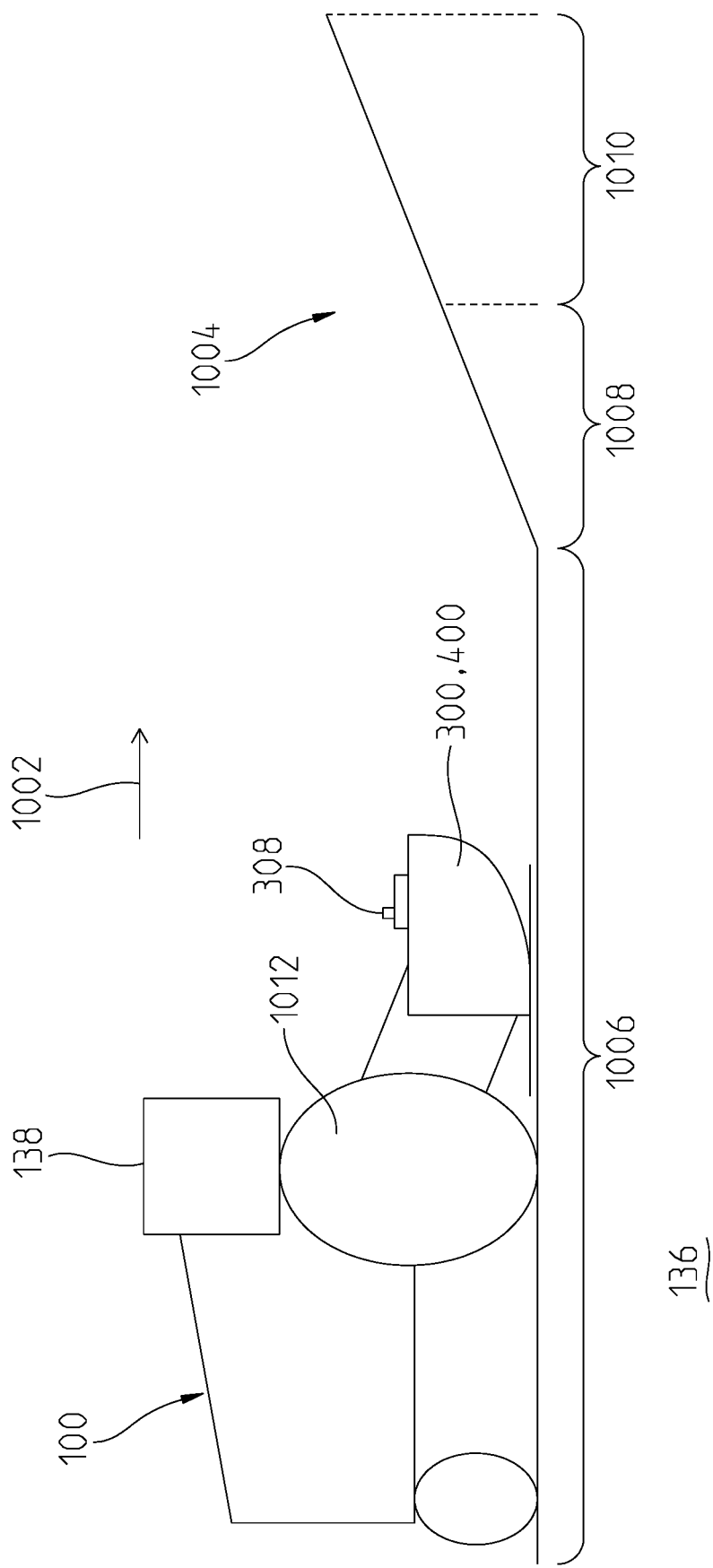
FIG. 10 is a schematic view of one ground changing scenario.

Referring now to FIG. 10, a side schematic view of a ground contour change is illustrated. In FIG. 10, the work machine 100 is illustrated travelling in a forward direction 1002 towards a grade change 1004. In the example of FIG. 10, the grade change 1004 may be an incline in the underlying surface 136. However, the teachings of this disclosure may also be applied to declines and lateral changes in the underlying surface 136 as well. In the schematic view of FIG. 10, the underlying surface is divided into a planar section 1006, a partial incline section 1008, and a full incline section 1010.

The planar section 1006 may be representative of portions of a field or the like wherein the underlying surface 136 is substantially planar. In the planar section 1006, the implement 300, 400 may be positioned as instructed by the implement position system 152. That is to say, the underlying surface 136 is not altering the position of the implement 300, 400 relative to the work machine 100 because both the implement 300, 400 and the work machine 100 are positioned on the planar underlying surface 136.

However, as the work machine travels in the forward direction towards the grade change 1004, the implement 300, 400 moves into the partial incline section 1008 before wheels 1012 of the work machine 100. In this situation, the implement 300, 400 may have skids, wheels, or other ground contacting mechanisms that cause the implement 300, 400 to move relative to the work machine 100 as the implement 300, 400 travels along the partial incline section 1008 while the work machine 100 remains on the planar section 1006.

As described herein, the implement 300, 400 may be coupled to the work machine 100 with a plurality of linkages or the like that allow the implement 300, 400 to move relative to the work machine 100. In the embodiments illustrated herein, the lift arms 110, 112 and upper link 302 are pivotally coupled to the work machine 100 to allow the implement 300, 400 to raise and lower while substantially maintaining the tilt orientation or pitch 304 of the implement 300, 400. In the scenario illustrated in FIG. 10, maintaining the pitch orientation of the implement 300, 400 as it enters the partial incline section 1008 may cause any cutting mechanisms or the like of the implement 300, 400 to cut into the underlying surface 136. In other words, when the implement 300, 400 is in the partial incline section 1008, the implement 300, 400 and the work machine 100 are no longer occupying a coplanar surface and the pitch 304 of the implement 300, 400 may drive the implement 300, 400 into the underlying surface 136 unless the pitch 304 is adjusted.

Figure 11:
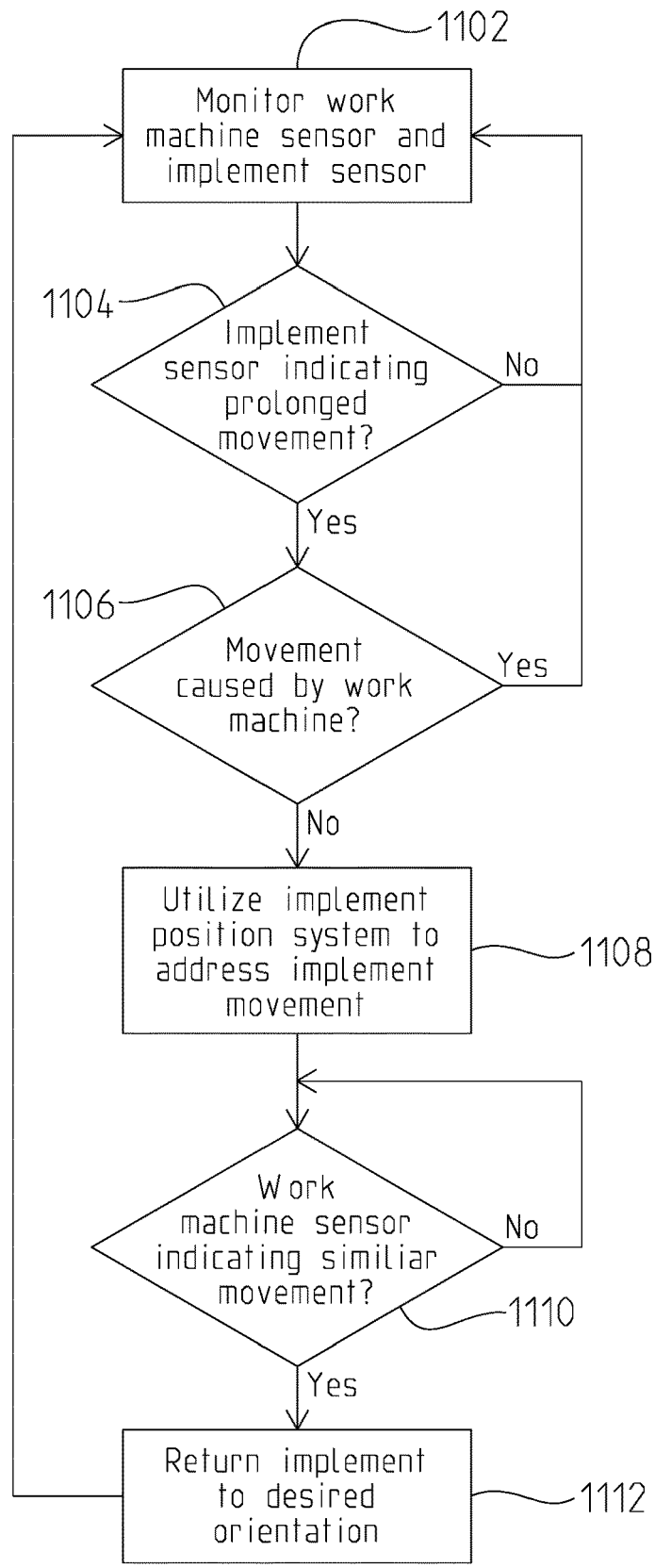
FIG. 11 is a schematic view of another embodiment of an implement position logic system.

Referring now to FIG. 11, one exemplary logic flowchart is illustrated that allows the controller 608 to adjust the implement position system 152 to address changes in the contour of the underlying surface 136. More specifically, the controller 608 may monitor the implement sensor 308 and the work machine sensor 138 in box 1102. In the example of FIG. 10, the controller 608 may compare the implement sensor 308 position to the work machine sensor 138 to identify the orientation of the work machine 100 and the implement 300, 400. As the implement 300, 400 enters the partial incline section 1008, the controller 608 may identify a height change in the implement 300, 400 relative to the work machine 100 as the implement 300, 400 travels up the incline of the underlying surface 136.

In one aspect of this disclosure, the controller 608 may utilize a filter or the like to manage readings from the work machine sensor 138 and implement sensor 308. More specifically, the controller 608 may be filtering out signals that are indicative of short changes to the work machine 100 or implement 300, 400 that are not caused by a substantial change in grade of the underlying surface 136. As one non-exclusive example, the controller 608 may monitor the sensors 138, 308 for prolonged changes and disregard short changes that may be caused by debris on the underlying surface 136 or the like. In box 1104, the controller 608 may monitor the implement sensor 308 to identify any prolonged movements of the implement 300, 400. A prolonged movement may be any movement that is sustained for a sufficient amount of time to be indicative of a grade change in the underlying surface 136 rather than debris.

In box 1104, if the movement identified by the implement sensor 308 is not prolonged, the controller 608 will determine that the movement was caused by debris or the like and return to box 1102 to continue to monitor the sensors 138, 308. However, if the movement identified by the implement sensor 308 is prolonged, the controller 608 may check whether the work machine sensor 138 also experienced the movement in box 1106. In box 1106, the controller 608 may check whether the movement of the implement 300, 400 was caused by movement of the work machine 100. If the work machine sensor 138 indicates similar movement as the implement sensor 308, the controller may conclude that no further action is required and continue to monitor the sensors 138, 308 in box 1102.

However, if the controller 608 determines that the work machine 100 has not experienced similar movement in box 1106, the controller 608 may manipulate the position of the implement 300, 400 with the implement position system 152 to address the movement of the implement 300, 400. More specifically, in the example of FIG. 10, when the implement 300, 400 is on the partial incline section 1008 and the work machine 100 is on the planar section 1006, the controller 608 will have identified a prolonged change in the height of the implement 300, 400 with the implement sensor 308 in box 1104. Further, the controller 608 will have checked the work machine sensor 138 and identified that the work machine 100 has not caused the movement of the implement 300, 400 in box 1106. Accordingly, in this non-exclusive example of box 1108, the controller 608 may correlate the height increase of the implement 300, 400 with an incline in the underlying surface 136. Further, to avoid damaging the underlying surface and the implement 300, 400, the controller 608 may engage the upper link 302 to change the pitch 304 of the implement 300, 400 to match the incline in the grade.

After the controller 608 has modified the orientation of the implement 300, 400 in box 1108, the controller 608 may continue to monitor the work machine sensor 138 to determine when the work machine 100 has entered the grade change 1004 in box 1110. More specifically, the controller 608 may repeatedly check the work machine sensor 138 to identify when the work machine 100 is on the grade change 1004. As the work machine 100 enters the grade change 1004, the work machine sensor 138 will indicate the prolonged movement of the work machine 100 as the wheels 1012 enter the partial incline section 1008. Further, as the wheels 1012 travel up the partial incline section 1008, the work machine 100 and the implement 300, 400 may both occupy the grade change 1004 and be on a substantially coplanar portion of the underlying surface 136.

Once the controller 608 identifies that the work machine 100 has entered the grade change 1004 in box 1110, the controller 608 may engage the implement position system 152 to return the implement to the desired implement position in box 1112. In other words, in box 1112 the controller 608 may identify that the work machine 100 and implement 300, 400 are occupying a substantially planar surface and will return the implement position to the desired implement position (i.e. the desired implement position established in FIG. 8). After the implement 300, 400 is returned to the desired position in box 1112, the controller 608 may return to box 1102 and continue to monitor the sensors 138, 308 for further grade changes.

While the embodiment shown and described herein for FIGS. 10 and 11 refer to the work machine 100 approaching an incline in the underlying surface 136, a person skilled in the art understands that the disclosed teachings can also be applied when the work machine 100 approaches a decline in the underlying surface 136. More specifically, when a decline in the grade is approached the controller 608 may identify a drop in the height of the implement 300, 400 relative to the work machine 100. The drop in height may be addressed by tilting the pitch 304 of the implement 300, 400 forward to more closely follow the decline contour of the underlying surface 136 until the work machine 100 enters the decline as well. Accordingly, this disclosure contemplates utilizing the teachings discussed herein to manipulate the orientation of the implement 300, 400 to address any prolonged change in the underlying surface 136 to allow the implement 300, 400 to remain in the desired position relative to the underlying surface 136.

While two different implements 300, 400 are shown and described herein, this disclosure is not limited to these particular-style implements. Draper or rotary style heads are only a couple of the many potential types of heads that can be coupled to the work machine 100. Accordingly, this disclosure should not be limited to any particular type of head.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this pertains and which fall within the limits of the appended claims.

The invention claimed is:

1. A work machine, comprising:
   an implement coupled to a frame of the work machine, the implement comprising a draper head or a rotary head configured to be positioned above an underlying surface;
   a first sensor coupled to the implement;
   a second sensor coupled to the frame of the work machine;
   a controller; and
   an implement position system that couples the implement to the frame, wherein the implement positioning system is configured to move the implement to a preset position wherein the implement positioning system provides for movement of the implement without changing the preset position;
   wherein, the first sensor identifies the orientation of the implement along more than one axis;
   wherein, the controller manipulates the implement position system to reposition the implement relative to the frame based on the orientation of the implement identified by the first sensor;
   wherein, the controller manipulates the implement position system to follow a contour of the underlying surface by comparing orientation data from the first sensor with orientation data from the second sensor to identify when the implement has moved relative to the frame.

2. The work machine of claim 1, further wherein the first sensor identifies the position of the implement along both a pitch axis and a roll axis and is configured to identify the height of the implement above the underlying surface.

3. The work machine of claim 1, wherein the orientation of the implement is identified by comparing values of the first sensor with values of the second sensor.

4. The work machine of claim 1, further wherein the second sensor establishes a level position relative to the underlying surface in a calibration process.

5. The work machine of claim 1, wherein the controller manipulates the implement position system to reposition the implement relative to the work machine by comparing orientation data from the first sensor to orientation data from the second sensor.

6. The work machine of claim 1, further wherein the first sensor establishes a lowered position and a raised position during a calibration process.

7. A method for identifying and altering the orientation of an implement, comprising:
providing a first sensor coupled to the implement, the implement configured to be positioned above an underlying surfacer;
providing a controller, a work machine, and an implement position system, the implement positioning system configured to move the implement to a preset position wherein the implement positioning system provides for movement of the implement without changing the preset position;
communicating, to the controller with the first sensor, an implement pitch position and an implement roll position;
storing the preset posit ion in the controller, the preset position comprising one or more of a first pitch position, a first roll position, and a first height of the implement; and
repositioning the implement with the controller;
wherein the controller communicates with the first sensor to selectively reposition the implement with the implement position system into the preset position;
wherein, the implement is configured to move out of the preset position through contact with an obstruction on an underlying surface;
wherein, the controller manipulates the implement position system to follow a contour of the underlying surface by comparing orientation data from the first sensor with orientation data from a second sensor to identify when the implement has moved relative to the work machine;
wherein, the implement comprises a draper head or a rotary head.

8. The method of claim 7, wherein the second sensor communicates to the controller a work machine pitch position and a work machine roll position relative to the underlying surface.

9. The method of claim 8, wherein the controller determines the position of the implement relative to the underlying surface by identifying the pitch position and the roll position of the work machine relative to the underlying surface and by identifying the pitch position and the roll position of the implement relative to the work machine.

10. The method of claim 9, further wherein the controller repositions the implement to follow the contour by comparing movement of the implement relative to a frame of the work machine, the movement of the implement identified by the first sensor and the position of the work machine identified by the second sensor.

11. The method of claim 7, further wherein the first sensor communicates an acceleration of the implement to the controller.

12. The method of claim 11, further comprising storing an acceleration threshold in the controller, wherein when the acceleration of the implement exceeds the acceleration threshold the controller sends a command to adjust the implement.

13. A work machine having an implement orientation system, comprising:
a frame;
an implement coupled to the frame, the implement comprising a draper head or a rotary head configured to be positioned above an underlying surface;
a controller;
a first sensor coupled to the implement and communicating an implement position to the controller;
a second sensor coupled to the frame and communicating a work machine position to the controller; and
an implement position system that communicates with the controller to alter the orientation of the implement relative to the frame to a preset position, the implement position system having at least one float cylinder and being configured to move the implement to the preset position wherein the implement positioning system provides for movement of the implement without changing the preset position;
wherein, the controller compares the implement position to the work machine position to identify the orientation of the implement with an underlying surface;
wherein, the implement is movable out of the preset position upon contact with an obstruction on the underlying surface, the at least one float cylinder configured to provide a biasing force on the implement away from the underlying surface;
wherein, the controller manipulates the implement position system to follow a contour of the underlying surface by comparing orientation data from the first sensor with orientation data from the second sensor to identify when the implement has moved relative to the frame out of the preset position.

14. The work machine having an implement orientation system of claim 13, further wherein the second sensor communicates a work machine pitch to the controller and the first sensor communicates an implement pitch to the controller.

15. The work machine having an implement orientation system of claim 14, further wherein the controller compares the work machine pitch to the implement pitch to determine the position of the implement relative to the frame of the work machine.

16. The work machine having an implement orientation system of claim 13, wherein the preset position is input through a user interface.

17. The work machine having an implement orientation system of claim 16, further wherein the controller positions the implement in the preset position with the implement position system by comparing the work machine position to the implement position.

* * * * *